(12) United States Patent
Scholz

(10) Patent No.: US 12,220,759 B2
(45) Date of Patent: Feb. 11, 2025

(54) RESISTANCE WELDING APPARATUS AND RESISTANCE WELDING METHOD FOR THE RESISTANCE WELDING OF AT LEAST ONE COMPONENT

(71) Applicant: Robert Bosch GmbH, Stuttgart (DE)

(72) Inventor: Reinhard Scholz, Erbach (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 16/836,145

(22) Filed: Mar. 31, 2020

(65) Prior Publication Data

US 2020/0324359 A1 Oct. 15, 2020

(30) Foreign Application Priority Data

Apr. 9, 2019 (DE) ..................... 10 2019 205 037.9

(51) Int. Cl.
*B23K 11/24* (2006.01)
*B23K 11/25* (2006.01)
*B23K 101/00* (2006.01)

(52) U.S. Cl.
CPC .......... *B23K 11/241* (2013.01); *B23K 11/258* (2013.01); *B23K 2101/006* (2018.08)

(58) Field of Classification Search
CPC ................ B23K 11/241; B23K 11/258; B23K 2101/006
See application file for complete search history.

(56) References Cited

U.S. PATENT DOCUMENTS

2017/0173725 A1* 6/2017 Luger .................... H01L 23/492
2019/0030634 A1* 1/2019 Henry .................. B23K 9/1043

FOREIGN PATENT DOCUMENTS

| DE | 102015225038 A1 | * | 6/2017 | |
|---|---|---|---|---|
| EP | 835713 A1 | * | 4/1998 | ............ B23K 11/11 |
| EP | 1219379 A2 | * | 7/2002 | ............ B23K 11/11 |
| EP | 3 181 284 A1 | | 6/2017 | |
| EP | 3 584 029 A1 | | 12/2019 | |
| WO | 2013/063628 A1 | | 5/2013 | |

OTHER PUBLICATIONS

European Search Report corresponding to European Patent Application No. 20160830.4, dated Oct. 28, 2020 (5 pages).

\* cited by examiner

*Primary Examiner* — Phuong T Nguyen
*Assistant Examiner* — Dilnessa B Belay
(74) *Attorney, Agent, or Firm* — Maginot, Moore & Beck LLP

(57) ABSTRACT

A resistance welding apparatus includes a welding tool with a welding electrode configured to contact a component. A welding transformer is configured to feed an electric current to the welding tool and a control device is configured to control a polarity of welding transformer by transmitting polarity information to the welding transformer such that a polarity of the welding transformer is switchable. A circuit including two transistors is operably connected in series between the welding tool and an output of the welding transformer and a polarity one of the transistors is rotated relative to the other transistor, such that a polarity of a welding voltage at the welding electrode is switchable with the switching of the polarity of the welding transformer, and such that a polarity of a welding current at the welding transformer is switchable with the switching of the polarity of the welding transformer.

12 Claims, 3 Drawing Sheets

RESISTANCE WELDING APPARATUS AND RESISTANCE WELDING METHOD FOR THE RESISTANCE WELDING OF AT LEAST ONE COMPONENT

This application claims priority under 35 U.S.C. § 119 to application no. DE 10 2019 205 037.9 filed on Apr. 9, 2019 in Germany the disclosure of which is incorporated herein by reference in its entirety.

The present disclosure relates to a resistance welding apparatus and a resistance welding method for the resistance welding of at least one component.

BACKGROUND

Resistance welding of various sheet metal combinations is used in automated vehicle manufacture, for example, in which welding apparatuses produce welding connections on, for example, a body of a vehicle such as motor vehicle, truck, aircraft, etc. Here as well as in other manufacturing installations, such as, for example, production lines for furniture, radiators, etc., metallic parts are connected by welding with the aid of a welding tool of the welding apparatus.

Moreover, a welding apparatus, in particular a resistance welding apparatus, can also be used in one-off production.

Magnetization of the welded parts can occur as a result of the DC current during welding. Consequently, the further processing of the welded metallic parts is made more difficult.

The possible magnetization of installation parts can result in contamination and malfunctions in the welding installation.

Moreover, as a result of different alloys for the welded metal sheets, different sheet metal thickness combinations and the Peltier effect in the case of aluminum, in a manner dependent on the welding current direction, undesired erosion at the welding electrodes and/or material creep can occur.

These effects additionally occur in particular during the resistance welding of chain links and during the welding of radiators.

In order to avoid the magnetization effects, consideration could be given to using a rectifier having four thyristors instead of a conventional diode rectifier that is usually installed in the resistance welding apparatus for providing the welding current.

What is disadvantageous about such a solution, however, is that firstly the rectifier having four thyristors requires double the structural space in comparison with the diode rectifier. As a result of the doubled structural space, the rectifier having four thyristors becomes very unwieldy and inefficient in terms of handling. This is disadvantageous not just for an apparatus for moving the resistance welding apparatus in space, such as a robot, for example.

Secondly the rectifier having four thyristors manifests poorer operating properties in comparison with the diode rectifier since the rectifier having four thyristors has higher losses and a lower power. The poorer operating properties are undesirable with regard to use that conserves resources. Moreover, the poorer operating properties cause higher costs for the operator of the resistance welding apparatus.

It is possible, moreover, to carry out polarity switching of the welding voltage for the welding tool. In such a case, however, an electrical cable has to be provided between the welding transformer fitted in the case of a, more particularly robot-guided, welding tool and a converter in the case of a welding controller provided in a stationary fashion. A 24 V signal can be transmitted via the cable, said signal being used to vary the polarity of the welding voltage. This additional cable connection via the robot fundamentally entails a high risk regarding, for example, cable defect, in particular cable break, and/or open connectors at the transformer and/or cable exchange. As a result, it is necessary additionally to pass a feedback signal from the transformer back to the welding controller and to monitor said feedback signal in the transformer and/or the controller. This monitoring also has a quality assurance aspect for the strength of the welding spot. If a plurality of transformers are to be connected in parallel, it is also necessary for all the transformers to be connected to the additional electrical cables.

This means a large space requirement for corresponding terminals on the transformers and a large outlay on cabling.

SUMMARY

It is therefore an object of the present disclosure to provide a resistance welding apparatus and a resistance welding method for the resistance welding of at least one component with which the problems mentioned above can be solved. In particular, the intention is to provide a resistance welding apparatus and a resistance welding method for the resistance welding of at least one component for which the disturbing magnetization effect is avoided very efficiently, without complexity, cost-effectively and with high safety.

This object is achieved by means of a resistance welding apparatus for the resistance welding of at least one component according to the disclosure. The resistance welding apparatus has a welding tool comprising at least one welding electrode which is to be contacted with the at least one component for the purpose of welding, at least one welding transformer for feeding an electric current to the welding tool during the welding of the at least one component, a series circuit comprising two transistors, which are connected between the welding tool and an output of the welding transformer, and a control device for controlling the polarity of the at least one welding transformer by transmitting polarity information to the at least one welding transformer, wherein the polarity of one transistor of the series circuit is rotated relative to the polarity of the other transistor of the series circuit, such that the polarity of the at least one welding transformer is switchable in order to realize a polarity-switchable welding voltage and a polarity-switchable welding current at the welding transformer.

In the case of the resistance welding apparatus, no additional cable has to be laid between the stationary welding controller and a welding transformer in order to realize polarity switching of the transformer of the welding apparatus. This affords a great advantage since the welding transformer is usually moved together with the welding tool in space. As a result, it is possible to realize a construction of the welding transformer with a small structural size and with low losses, without thereby having to accept losses in terms of safety. The welding transformer is preferably embodied as a medium-frequency direct-current transformer (MF DC transformer) and is also referred to as a transformer-rectifier unit.

With the construction described, the disturbing magnetization effect that arises in the case of a conventional diode rectifier can be avoided with the described resistance welding apparatus very efficiently, without complexity, cost-effectively and with high safety.

The resistance welding apparatus disclosed has lower losses and a smaller structural space but a higher power than the thyristor solution described above. Moreover, the resistance welding apparatus disclosed has a similar performance and similar structural space but lower losses compared with an MF DC transformer having a diode rectifier according to the prior art.

Overall, with the resistance welding apparatus disclosed, it is possible to realize implementable and checkable polarity switching without complexity for a welding transformer with a small structural size, with low losses and low outlay.

Possibly, the control device is configured to provide the polarity information in a voltage that is applied to the primary side of the at least one welding transformer.

It is conceivable for the control device to be configured to provide the polarity information as a digital signal.

In one configuration, the control device and the at least one welding transformer are connectable via at least one line in addition to a connection for the voltage that is to be applied to the primary side of the at least one welding transformer, and wherein the control device is configured to transmit the polarity information to the welding transformer via the at least one line.

The at least one welding transformer can have a polarity switching device configured for evaluating the polarity information and configured for switching the polarity of the at least one welding transformer on the basis of the evaluation result.

Optionally, the at least one welding transformer is formed from a parallel connection of at least two transformers.

In this case, the polarity switching device is possibly configured to switch all at least two transformers connected in parallel always into the same polarity.

It is also possible for the resistance welding apparatus additionally to comprise a detection device for detecting a voltage between the two welding electrodes during welding with the welding tool, wherein the control device is configured to check the switching of the polarity by a comparison of the voltage detected by the detection device with a predetermined reference value of the voltage.

The welding transformer can have two outputs, at which a respective series circuit comprising two transistors is connected upstream of the welding tool.

The two transistors are optionally metal oxide semiconductor field effect transistors. In one configuration, the welding tool is welding tongs comprising two welding electrodes, between which the at least one component is arranged during welding.

The resistance welding apparatus described above can be part of an installation provided for the treatment of objects. In this case, the resistance welding apparatus can be provided for the resistance welding of at least one component provided for the treatment of at least one of the objects. The installation can be configured for the manufacture of vehicle bodies in white or radiators or chains as objects.

The object is additionally achieved by means of a resistance welding method for the resistance welding of at least one component according to the disclosure. The resistance welding method is carried out by means of a resistance welding apparatus comprising a welding tool comprising at least one welding electrode which is to be contacted with the at least one component for the purpose of welding, at least one welding transformer for feeding an electric current to the welding tool during the welding of the at least one component, a series circuit comprising two transistors, which are connected between the welding tool and an output of the welding transformer, and a control device. In this case, the resistance welding method comprises the steps of: transmitting, by means of the control device, polarity information to the at least one welding transformer in order to control the polarity of the at least one welding transformer, switching the polarity of the two transistors by one of the transistors being switched on depending on the polarity information, and switching on in a positively conducting fashion the transistor connected in series with the switched-on transistor during synchronous operation with current, as a result of which the polarity of one transistor of the series circuit is rotated relative to the polarity of the other transistor of the series circuit in order to realize a polarity-switchable welding voltage and a polarity-switchable welding current at the welding transformer.

The resistance welding method affords the same advantages as mentioned above in relation to the resistance welding apparatus.

Further possible implementations of the disclosure also encompass not explicitly mentioned combinations of features or embodiments described above or below with respect to the exemplary embodiments. In this case, the person skilled in the art will also add individual aspects as improvements or supplementations to the respective basic form of the disclosure.

BRIEF DESCRIPTION OF THE DRAWINGS

The disclosure is described in greater detail below with reference to the accompanying drawings and on the basis of exemplary embodiments. In the figures.

In the figures, identical or functionally identical elements are provided with the same reference signs, unless indicated otherwise.

DETAILED DESCRIPTION

Figure 1:
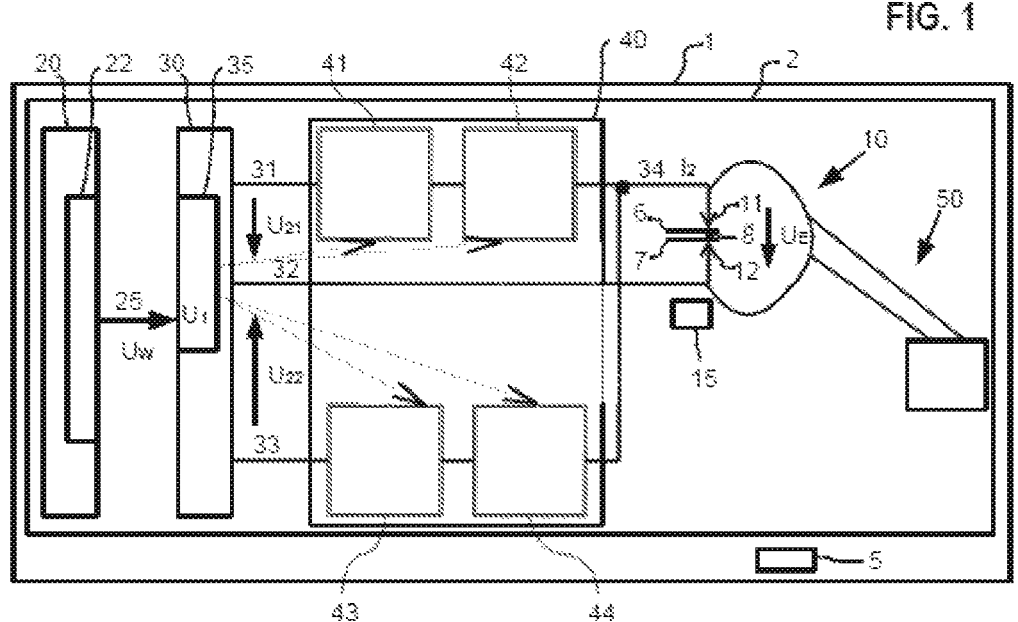
FIG. 1 shows a block diagram of an installation comprising a resistance welding apparatus in accordance with a first exemplary embodiment.

FIG. 1 shows highly schematically an installation 1 comprising a resistance welding apparatus 2. The installation 1 can be for example a manufacturing installation for objects 5, such as vehicles, furniture, radiators, etc.

In the manufacturing installation 1, metallic components 6, 7 can be connected by resistance welding in such a way that a welding connection 8 is produced. It is possible here for two edges of a single component 6, for example, to be connected to one another by means of resistance welding with one or more welding connections 8. Irrespective of how many components 6, 7 are connected to one another with a welding connection 8, the welding connection(s) 8 can be a spot weld or a weld seam or combinations thereof.

For the purpose of welding, the resistance welding apparatus 2 comprises a welding tool 10 in the form of welding tongs comprising two welding electrodes 11, 12, a detection device 15, which is arranged at the welding tool 10 for detecting an electrode voltage $U_E$, a welding controller or control device 20 with a converter 22 connected thereto having an output 25, a welding transformer 30 having three outputs 31, 32, 33 and an evaluation unit 35, a rectifier branch or a rectifier circuit 40 comprising a first transistor 41, a second transistor 42, a third transistor 43, a fourth transistor 44, and an apparatus 50 for guiding the welding tool 10.

The resistance welding apparatus 2 can produce a welding connection 8 by means of the welding tool 10 under the control of the control device 20. For this purpose, the converter 22 supplies at its output an AC voltage $U_W$ for supplying the transformer 30 with power. The AC voltage $U_W$ is present at an input $U_1$ of the transformer 30 on the primary side of the transformer 30. The AC voltage $U_W$ serves for supplying power to the transformer 30 for providing a welding current I2.

On the secondary side of the welding transformer 30, a first secondary voltage U21 is present between the first and second outputs 31, 32 of the welding transformer 30. Moreover, a second secondary voltage U22 is present between the second and third outputs 32, 33 of the welding transformer 30. The first secondary voltage U21 and the second secondary voltage U22 form a welding voltage U21, U22 which results in the welding current I2.

The first transistor 41 is connected to the first output 31 of the welding transformer 30. A second transistor 42 is connected in series with the first transistor 41. As a result, the series circuit comprising first and second transistors 41, 42 is connected between the welding transformer 30 and the welding tool 10. To put it more precisely, the series circuit comprising first and second transistors 41, 42 is connected between the welding transformer 30 and the first welding electrode 11.

The second welding electrode 12 is directly connected to the second output 32 of the welding transformer 30.

The third transistor 43 is connected to the third output 32 of the welding transformer 30. A fourth transistor 44 is connected in series with the third transistor 43. As a result, the series circuit comprising third and fourth transistors 43, 44 is connected between the welding transformer 30 and the welding tool 10. To put it more precisely, the series circuit comprising third and fourth transistors 43, 44 is connected between the welding transformer 30 and the first welding electrode 11.

With the aid of the AC voltage $U_W$, which is illustrated versus time t in FIG. 2, together with the polarity switching module 35 of the transformer 30, the control device 20 can switch the transistors 41, 42, 43, 44 for changing the polarity of the transformer 30, as described below. In accordance with FIG. 2, for this purpose, the AC voltage $U_W$ has polarity information 25A, 25B, that is to say information about how the polarity of the transformer 30 is to be switched.

For the purpose of switching the polarity of the transformer 30, the polarity switching module 35 evaluates the polarity information 25A, 25B of the AC voltage $U_W$. The polarity switching module 35 can carry out the evaluation at least partly with the aid of software that runs on the polarity switching module 35.

Figure 2:
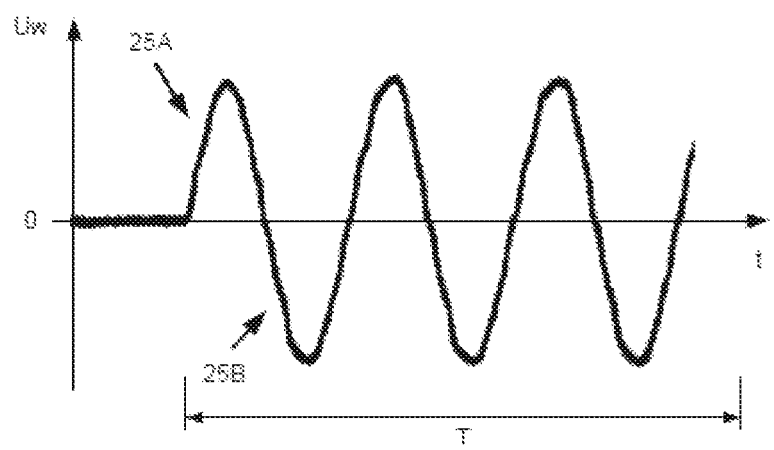
FIG. 2 shows a first example of the first part of the profile of an electrical system supply voltage for a welding transformer of the resistance welding apparatus in accordance with the first exemplary embodiment.

By way of example, the polarity switching module 35 is set in such a way that in the evaluation of the polarity information 25A, 25B of the AC voltage $U_W$, it is assumed that at the beginning of a welding time T the first power pulse from the converter 22 to the transformer 30 is always implemented as a positive voltage $U_W$ to the terminal $U_1$ on the primary side of the transformer 30, as shown in FIG. 2. In one configuration, said positive voltage $U_W$ forming the polarity information 25A can be evaluated by the converter 22 and/or the polarity switching module 35 in such a way that a positive polarity is to be switched for the transformer 30. Accordingly, the polarity switching module 35 drives the transistors 41, 42, 43, 44 in order to set the predefined positive polarity of the transformer 30.

In the case of a first negative voltage $U_W$ at the terminal $U_1$ on the primary side of the transformer 30, said negative voltage can be identified by the polarity switching module 35 as a negative output voltage $U_W$ of the control device 20. The first negative voltage $U_W$ thus forms the polarity information 25B, as illustrated in FIG. 2. Accordingly, the polarity switching module 35 drives the transistors 41, 42, 43, 44 in order to adjust the transformer 30 from the positive polarity to the now predefined negative polarity of the transformer 30.

Figure 3:
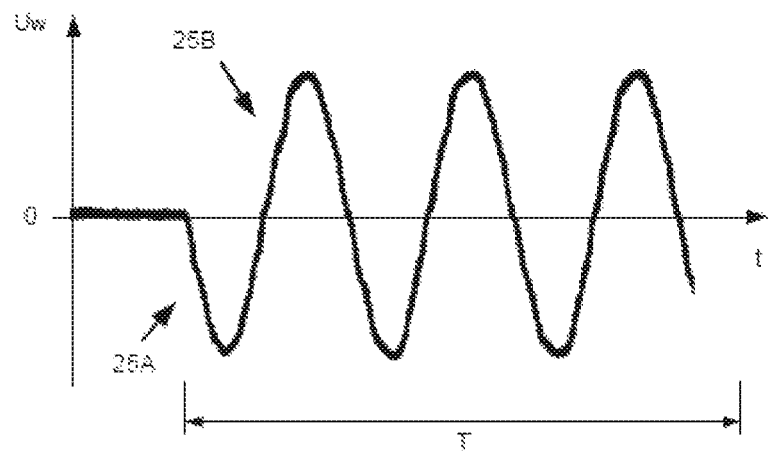
FIG. 3 shows a second example of the first part of the profile of an electrical system supply voltage for a welding transformer of the resistance welding apparatus in accordance with the first exemplary embodiment.

FIG. 3 shows an alternative to the voltage $U_W$ from FIG. 2. In the case of the alternative in accordance with FIG. 3, the polarity switching module 35 is set in such a way that in the evaluation of the polarity information 25A, 25B of the AC voltage $U_W$, it is assumed that at the beginning of a welding time T the first power pulse from the converter 22 to the transformer 30 is always implemented as a negative voltage $U_W$ to the terminal $U_1$ on the primary side of the transformer 30. Accordingly, the polarity of the transformer 30 can be correspondingly switched in a manner as preset in the polarity switching module 35.

Thus, by means of a corresponding choice of the polarity of the AC voltage $U_W$, the control device 20 from FIG. 1 can predefine how the polarity of the transformer 30 is intended to be switched. The transistors 41 to 44 are then driven by the polarity switching module 35, which evaluates the polarity of the AC voltage $U_W$. The polarity switching module 35 is configured to switch on a transistor of the transistors 41, 42, 43, 44 in each case in a manner dependent on the AC voltage $U_W$ and the polarity preselection. The series-connected transistor of the transistors 41, 42, 43, 44 is then switched on in a negatively conducting fashion during synchronous operation with current.

By way of example, the control device 20 switches on the first transistor 41 in each case in a manner dependent on the output voltage and the polarity preselection. The series-connected second transistor 42 is then switched on in a negatively conducting fashion during synchronous operation with current.

In principle, it holds true that the pair of transistors for the polarity selection is positively conducting, and the pair of transistors for the synchronous rectification is negatively conducting. In the example above, it thus holds true that the transistors 41, 43 for the polarity selection are positively conducting, and the transistors 42, 44 for the synchronous rectification are negatively conducting. If no polarity switching is required, the transistors 41, 43 from FIG. 1 can be omitted. Alternatively, the transistors 42, 44 from FIG. 1 can be omitted.

In particular, the transistors 41, 42 are N-channel MOSFETs. The same applies to the transistors 43, 44.

As a result, in the rectifier branch or the rectifier circuit 40, per rectifier two transistors, namely the transistors 41, 42 in the example, in series are then switched on. The same applies in the same way to the series circuit comprising third and fourth transistors 43, 44 as a further rectifier of the rectifier branch or rectifier circuit 40.

In this way, a polarity-switchable welding voltage U21, U22 and a polarity-switchable welding current I2 can be realized at the welding transformer 30.

The polarity information 25A, 25B is thus linked with the power connection of the transformer 30. As a result, there is no need for a cable between an additional 24 V output at the converter 22 and a corresponding input at the transformer 39 for the polarity switching. In addition to this, it is possible to dispense with the feedback signal for communicating the actual polarity of the transformer 30 on the basis of the evaluation by the polarity module 35. Instead, the detection device 15 enables polarity monitoring by means of the connection—with correct polarity—of the standard detection of the electrode voltage $U_E$ during welding on the basis of a reference value detection which is carried out during start-up. In other words, the polarity module 35 and/or the control device 20 with the aid of the detection device 15 can carry out the polarity monitoring by means of a detection of the actual value of the voltage $U_E$ at the electrodes 11, 12 during welding and the comparison of the actual value of the voltage $U_E$ with the associated reference value of the voltage $U_E$ at the electrodes 11, 12. The reference value can be stored in the polarity module 35 and/or the control device 20.

Independently of the two variants in accordance with FIG. 2 and FIG. 3, during the control with the aid of the control device 20, the following procedure is additionally adopted during the welding of components having different thicknesses, such as metal sheets, etc. Major advantages are afforded here particularly in the case of aluminum sheets, but not exclusively in the case of such components, as described below.

In the case of such components, the control device 20 controls the polarity switching in such a way that the positive electrode of the welding tool 10 bears against the thicker component 6, for example, and the negative electrode of the welding tool 10 bears against the thinner component 7. As a result, the welding nugget or the welding connection 8 is drawn more into the thicker component 6 since during welding the positive electrode or the electrode cap attached thereto is always hotter than the negative electrode or the electrode cap attached thereto and, in addition, the thinner component 7 in principle becomes hotter than the thicker component 6. As a result, during welding the hottest point always extends in the direction of the positive electrode, that is to say here the thicker component 6, against which the positive electrode bears.

Consequently, with the aid of polarity switching controlled in this way, the electrodes 11, 12 of the welding tool 10 can be switched rapidly and reliably from negative to positive or back, depending on which component 6, 7 is assigned to which electrode 11, 12 of the welding tool 10, in order to produce welding connections 7 of high quality. A rotation of the welding tool 10 from welding location to welding location is thus not necessary. This is particularly advantageous since a rotation of the welding tool 10 is time-consuming and control-intensive, that is to say thus cost-intensive. Moreover, a rotation of the welding tool 10 is possibly associated with a high risk of collision or even not possible at all owing to confined space conditions at the component.

A further advantage of the above-described control by the control device 10 is that the cap erosion at the electrodes 11, 12 is set uniformly by the polarity switching. Specifically, cap erosion that arises at the hotter positive electrode is in each case greater than that at the negative electrode. The caps have to be milled off when maximum erosion is reached, and have to be changed after repeated milling, which causes stoppages in production. Since, by means of the polarity switching, each of the electrodes 11, 12 is connected as positive electrode or as negative electrode as necessary, milling has to be carried out less frequently and the caps have to be changed less frequently. Consequently, the described control of the control device 20 makes it possible to utilize the time for production more effectively. In addition, valuable resources and costs are saved as a result of the less frequently required cap change.

As a result, the resistance welding apparatus 2 is able to be used particularly advantageously in the case of sheet metal combinations in which undesirable erosion of the welding electrodes 11, 12 or material creep occurs in the case of welding tongs as welding tool 10. Moreover, the resistance welding apparatus 3 can be used particularly advantageously during the welding of chain links and during the welding of radiators.

Figure 4:
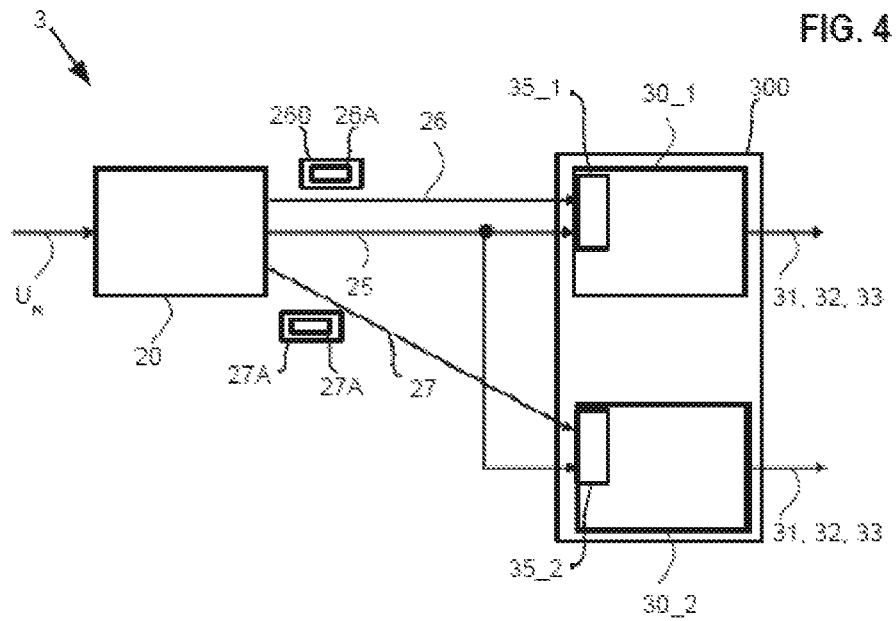
FIG. 4 shows a block diagram of a parallel connection of transformers of a resistance welding apparatus in accordance with a second exemplary embodiment.

FIG. 4 shows a resistance welding apparatus 3 in accordance with a second exemplary embodiment. The resistance welding apparatus 3 is constructed in many parts in the same way as described for the resistance welding apparatus 2 in accordance with the previous exemplary embodiment.

In contrast to the resistance welding apparatus 2 in accordance with the previous exemplary embodiment, the resistance welding apparatus 3 in accordance with the present exemplary embodiment has a welding transformer 300 constructed from a parallel connection of two transformers 30_1, 30_2. Each of the two transformers 30_1, 30_2 can be constructed like the transformer 30 in accordance with FIG. 1. Each of the two transformers 30_1, 30_2 is connected to the output 25 of the control device 20.

The transformer 30_1 is additionally connected to the control device 20 via a bus line 26. The transformer 30_1 is additionally connected to the control device 20 via a bus line 27. The bus lines 26, 27 realize a bus via which data 260, 270 can be transmitted, preferably in real time. Polarity information 26A, 27A is able to be transmitted in the data 260, 270. In particular, communication is effected on the bus using a Sercos protocol or Ethernet protocol or a CAN protocol or any other industrial bus.

In accordance with the standard DIN 44300 (information processing), part 9 (processing sequences), which has been superseded by DIN ISO/IEC 2382 in the meantime, real time is understood to mean the operation of a computing system in which programs for processing data that arise are constantly ready for operation such that the processing results are available within a predefined time period. The data may arise following a temporally random distribution or at predetermined points in time, depending on the application. Accordingly, the control device 20 and the polarity switching module 35 are configured in such a way that, owing to their hardware and software, no delays preventing these conditions from being complied with are caused and occur. Accordingly, the processing of the information of the voltage $U_W$ is carried out in a manner guaranteed to be fast enough for the switching of the polarity of the transformers 30_1, 30_2, 300, such that the processing of the information of the voltage $U_W$ does not result in any delay during the processing of a welding operation on the at least one component 6, 7.

Consequently, in the case of the transformer 300, the polarity of its parallel-connected transformers 30_1, 30_2 is controlled via the bus lines 26, 27. The polarity information 26A, 27A transmitted via the bus lines 26, 27 is able to be evaluated by means of the polarity switching modules 35_1, 35_2. The polarity information 26A, 27A can also comprise the actual polarity of the associated transformer 30_1, 30_2. The polarity of the respective transformer 30_1, 30_2 can be switched by means of the polarity switching modules 35_1, 35_2. In this case, the polarity switching modules 35_1, 35_2 are configured to switch the polarity of the transformers 30_1, 30_2 in such a way that the polarity of the transformers 30_1, 30_2 is always the same. By means of the detection device 15, it is possible to carry out the polarity monitoring by means of the standard detection of the actual value of the electrode voltage $U_E$ during welding and the comparison with the reference value of the electrode voltage $U_E$ at the electrodes 11, 12.

The above-described control of the polarity of the transformer 300 via the power connection 25 with correct polarity constitutes a very secure solution in the case of transformer parallel connection since each transformer 30_1, 30_2 has the same power supply.

Consequently, in the case of the variant in FIG. 4, too, additional outlay on cabling is not necessary, rather the bus lines 26, 27 present are used to switch the polarity of the transformer 300.

It goes without saying that, in a modification of the present exemplary embodiment, the welding transformer 300 is able to be constructed from a parallel connection of more than two transformers 30_1, 30_2. In this case, each of the other transformers is also connected to the bus formed by the bus lines 26, 27.

Alternatively, it is possible to carry out the above-described polarity switching by means of the information 26A, 27A and the bus line 26, 27 also in the case of the transformer 30 from FIG. 1, that is to say in the case of which no further transformer is connected in parallel. In this case, one of the items of information 26A, 27A can be provided by means of one of the bus lines 26, 27 in addition to or instead of the polarity information 25A, 25B and can be used to carry out the polarity switching. As a result, redundancy is able to be ensured as well. Moreover, it is possible to chose whether the polarity information 25A, 25B from the voltage $U_W$ or the information 26A, 27A by means of one of the bus lines 26, 27 shall be used.

Figure 5:
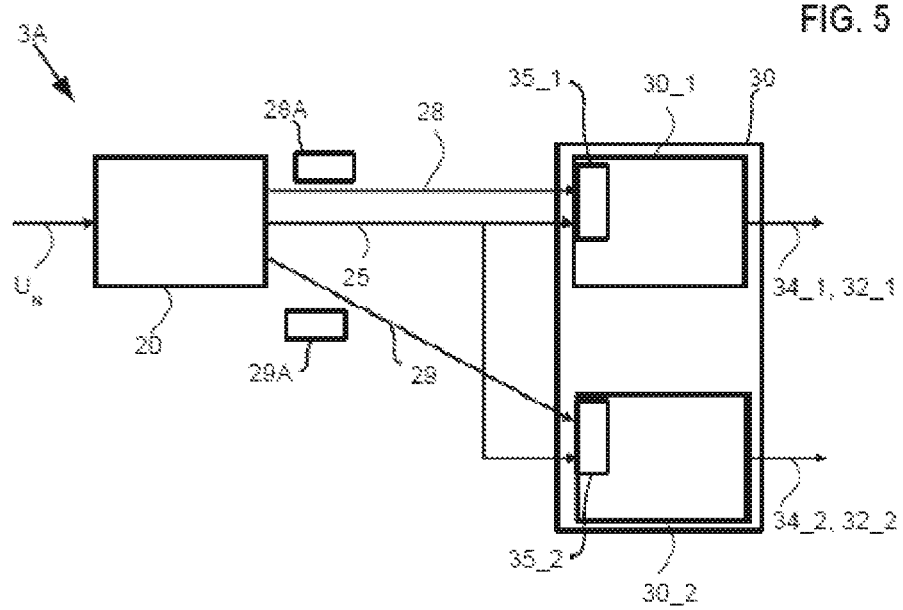
FIG. 5 shows a block diagram of a parallel connection of transformers of a resistance welding apparatus in accordance with a modification in a third exemplary embodiment.

FIG. 5 shows a resistance welding apparatus 3A in accordance with a third exemplary embodiment. The resistance welding apparatus 3A is constructed in many parts in the same way as described for the resistance welding apparatus 3 in accordance with the previous exemplary embodiment.

In contrast to the resistance welding apparatus 3 in accordance with the previous exemplary embodiment, the resistance welding apparatus 3A in accordance with the present exemplary embodiment has discrete connections or lines 28, 29 used to realize the control of the change in polarity of the transformers 30_1, 30_2 and thus of the transformer 300. Polarity information 28A, 29A in the form of a digital signal is transmitted via the discrete connections or lines 28, 29. Over the course of time t the signal has at least two different values separated sufficiently to transmit the different polarities as information 28A, 29A.

By means of a variant of the transformers 30_1, 30_2, 300, the polarity of the transformers 30_1, 30_2, 300 can be driven discretely for example in the case of external controllers. As a result, for example a superordinate welding controller that controls a plurality of welding tools 10 can also drive the transformers 30_1, 30_2, 300. Moreover, by way of the additional cabling realized by the discrete connections or lines 28, 29, it is possible to monitor the polarity or the switching thereof in the control device 20.

A further advantage of such a control of the polarity of the transformers 30_1, 30_2, 300 is simple exchange of a previous MOSFET transformer with its 24 V supply for a process-necessitated transformer 30_1, 30_2, 300 with polarity switching. Given a correspondingly adapted converter 22, such an exchange is possible without changing an existing cable assembly of the apparatus 10, since no additional connections are required at the transformer 30_1, 30_2, 300.

Alternatively, it is possible to carry out the above-described polarity switching by means of the information 28A, 29A and the lines 28, 29 also in the case of the transformer 30 from FIG. 1. In this case, one of the items of information 28A, 29A can be provided via one of the lines 28, 29 in addition to or instead of the polarity information 25A, 25B and can be used to carry out the polarity switching. As a result, redundancy is able to be ensured as well.

Figure 6:
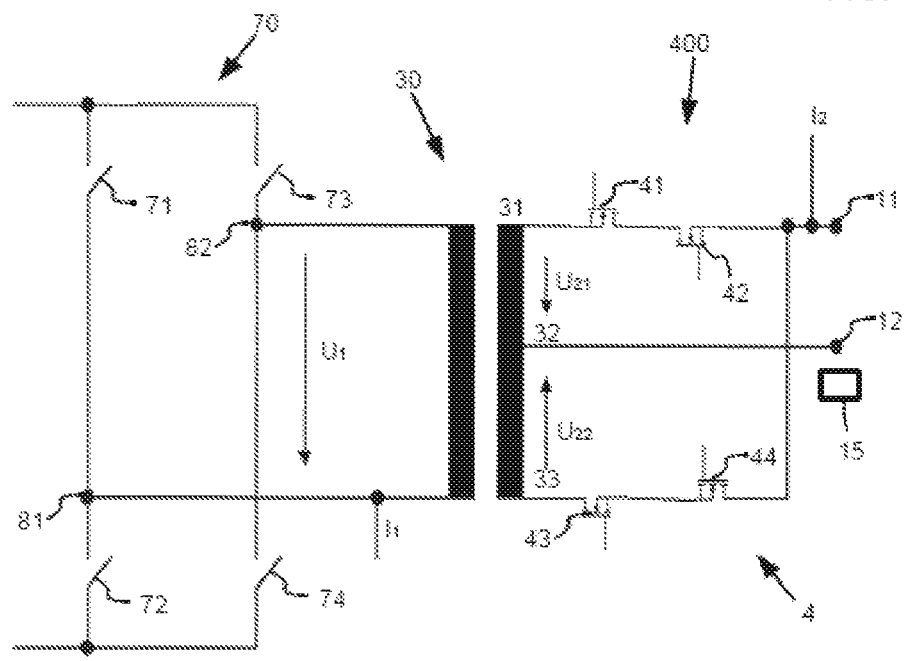
FIG. 6 shows a block diagram of an installation comprising a resistance welding apparatus in accordance with a fourth exemplary embodiment.

FIG. 6 shows a resistance welding apparatus 4 in accordance with a second exemplary embodiment. The resistance welding apparatus 4 is constructed in many parts in the same way as described for the resistance welding apparatus 2 in accordance with the first exemplary embodiment.

In contrast to the resistance welding apparatus 2 in accordance with the first exemplary embodiment, in the case of the resistance welding apparatus 4 in accordance with the present exemplary embodiment, the transistors 41, 42, 43, 44 are configured in each case specifically as metal oxide semiconductor field effect transistors (MOSFETs). The metal oxide semiconductor field effect transistors are connected in antiparallel in the case of the resistance welding apparatus 4.

As shown in FIG. 6, a primary voltage U1 on the primary side of the welding transformer 30 results from a bridge circuit 70 comprising semiconductor switches 71, 72, 73, 74. The semiconductor switches 71, 72, 73, 74 can each be, in particular, an insulated gate bipolar transistor (IGBT) of a converter.

In the circuit 70, the first semiconductor switch 71 and the second semiconductor switch 72 are connected in series. Moreover, the third semiconductor switch 73 and the fourth semiconductor switch 74 are connected in series. The primary voltage U1 on the primary side of the welding transformer 30 forms between a first connection node 81, which is arranged between the first and second semiconductor switches 71, 72, and a second connection node 82, which is arranged between the third and fourth semiconductor switches 73, 74.

On the secondary side of the welding transformer 30, a first secondary voltage U21 is present between the first and second outputs 31, 32 of the welding transformer 30. In addition, a second secondary voltage U22 is present between the second and third outputs 32, 33 of the welding transformer 30. The first secondary voltage U21 and the second secondary voltage U22 form the welding voltage U21, U22.

The welding transformer 30 converts the primary voltage U1 into the first and second secondary voltages U21, U22. In this case, the sum of the secondary voltages U21, U22 is less than the value of the primary voltage U1. Moreover, the welding transformer 30 converts a primary current I1 on the primary side of the welding transformer 30 into the secondary current I2 on the secondary side of the welding transformer 30. The secondary current I2, which can also be referred to as welding current, has a higher value than the primary current I1.

The circuit of the welding apparatus 4 as shown in FIG. 6 is switched by the control device 20 in the same way as described with regard to the previous exemplary embodiment.

The welding apparatus 4 can be used instead of the welding apparatus 2 in the installation 1 in accordance with the first exemplary embodiment. In particular, the rectifier 400 is configurable in the same way as described with regard to the first and second exemplary embodiments.

The welding apparatus 4 can also be used particularly advantageously in the case of sheet metal combinations in which different levels of erosion of the welding electrodes occur in the case of welding tongs. In addition, the welding apparatus 4 can be used particularly advantageously during the welding of chain links and during the welding of radiators.

All of the above-described configurations of the installation 1, of the resistance welding apparatuses 2, 3, 3A, 4 and of the resistance welding method can be used individually or in all possible combinations. In particular, all features and/or functions of the exemplary embodiments described above can be combined in any desired way. In addition, the following modifications are conceivable, in particular.

The parts illustrated in the figures are illustrated schematically and can deviate in the exact configuration from the forms shown in the figures as long as their functions described above are ensured.

The transistors 41, 42, 43, 44 can also be bipolar transistors, although the embodiment as metal oxide semiconductor field effect transistors (MOSFETs) is preferred.

Alternatively or additionally, it is possible for not (only) the polarity module 35 but also the control device 20 to be configured to switch on in a negatively conducting fashion the series-connected transistor 41, 43 during synchronous operation with electric current.

What is claimed is:

1. A resistance welding apparatus for the resistance welding of at least one component, comprising:
    a welding tool comprising a first welding electrode and a second welding electrode each configured to contact the at least one component and to receive a polarity-switchable electric welding current for welding the at least one component;
    at least one welding transformer configured to output at least one secondary voltage;
    a rectifier circuit operably connected to the at least one welding transformer and the welding tool, the rectifier circuit including a first transistor and a second transistor connected in series between the first welding electrode and a secondary winding of the at least one welding transformer to receive the at least one secondary voltage, the rectifier circuit configured to output the polarity-switchable electric welding current to the welding tool during the welding of the at least one component;
    a control device configured to control a polarity of the at least one welding transformer by transmitting polarity information directly to the at least one welding transformer through at least one first line connecting the control device to a primary winding of the at least one welding transformer; and
    a polarity switching device of the at least one welding transformer operably connected to the first transistor and the second transistor of the rectifier circuit, the polarity switching device configured to receive the polarity information that is applied to the at least one welding transformer through the at least one first line,
    wherein the polarity switching device is configured to switch a polarity of the at least one welding transformer based on the polarity information by driving the first transistor and the second transistor to output the polarity-switchable electric welding current from the rectifier circuit,
    wherein a polarity of the first transistor is opposite a polarity of the second transistor in the series connection of the first transistor and the second transistor, such that a polarity of a welding voltage at the first welding electrode is switchable with the switching of the polarity of the at least one welding transformer as performed by the polarity switching device, and such that a polarity of the polarity-switchable electric welding current is switchable with the switching of the polarity of the at least one welding transformer as performed by the polarity switching device, and
    wherein the polarity information is a polarity of an AC voltage carried by the at least one line that is applied to the primary winding of the at least one welding transformer for the generation of the polarity-switchable electric welding current and the welding voltage.

2. An installation for the manufacture of a joined device, comprising:
    a welding tool comprising a first welding electrode and a second welding electrode each configured to contact at least one component and to receive a polarity-switchable electric welding current for welding the at least one component;
    at least one welding transformer configured to output at least one secondary voltage;
    a rectifier circuit operably connected to the at least one welding transformer and the welding tool, the rectifier circuit including a first transistor and a second transistor connected in series between the first welding electrode and a secondary winding of the at least one welding transformer to receive the at least one secondary voltage, the rectifier circuit configured to output the polarity-switchable electric welding current to the welding tool during the welding of the at least one component;
    a control device configured to control a polarity of the at least one welding transformer by transmitting polarity information directly to the at least one welding transformer through at least one first line connecting the control device to a primary winding of the at least one welding transformer; and
    a polarity switching device of the at least one welding transformer operably connected to the first transistor and the second transistor of the rectifier circuit, the polarity switching device configured to receive the polarity information that is applied to the at least one welding transformer through the at least one first line,
    wherein the polarity switching device is configured to switch a polarity of the at least one welding transformer based on the polarity information by driving the first transistor and the second transistor to output the polarity-switchable electric welding current from the rectifier circuit,
    wherein a polarity of the first transistor is opposite a polarity of the second transistor in the series connection of the first transistor and the second transistor, such that a polarity of a welding voltage at the welding electrode is switchable with the switching of the polarity of the at least one welding transformer as performed by the polarity switching device, and such that a polarity of the polarity-switchable electric welding current is switchable with the switching of the polarity of the at least one welding transformer as performed by the polarity switching device, and wherein the polarity information is a polarity of an AC voltage carried by the at least one line that is applied to the primary winding of the at least one welding transformer for the generation of the polarity-switchable electric welding current and the welding voltage.

3. The resistance welding apparatus according claim 1, wherein the at least one welding transformer comprises:
a first transformer; and
a second transformer, the second transformer electrically connected in parallel with the first transformer.

4. The resistance welding apparatus according to claim 3, wherein the polarity switching device is configured to switch the first transformer and the second transformer to the same polarity.

5. The resistance welding apparatus according to claim 1, further comprising:
a detection device operably connected to the control device and configured to detect an electrode voltage between the first welding electrode and the second welding electrode,
wherein the control device is further configured to check a switching of the welding voltage polarity by a comparison of the detected electrode voltage with a predetermined reference electrode voltage.

6. The resistance welding apparatus according to claim 1, wherein:
the at least one welding transformer is configured to output the at least one secondary voltage between a first output and a second output of the at least one welding transformer,
the at least one welding transformer further includes a third output;
the first transistor and the second transistor are connected between the first welding electrode and the first output;
the rectifier circuit further comprises a third transistor and a fourth transistor connected in series between the first welding electrode and the third output; and
the series connected first transistor and second transistor are in parallel with the series connected third transistor and fourth transistor.

7. The resistance welding apparatus according to claim 6, wherein each of the first, the second, the third, and the fourth transistors are metal oxide semiconductor field effect transistors.

8. The resistance welding apparatus according to claim 1, wherein:
the first welding electrode and the second welding electrode are included in welding tongs; and
the first welding electrode and the second welding electrode are configured to receive the at least one component therebetween during welding.

9. The installation according to claim 2, further comprising:
at least one second line operably connecting the control device and the at least one welding transformer,
wherein the AC voltage applied to the primary winding of the at least one welding transformer is also applied to the primary winding through the at least one second line.

10. The installation according to claim 2, wherein the installation is configured for the manufacture of vehicle bodies in white, radiators, or chains.

11. The resistance welding apparatus according to claim 6, wherein the second welding electrode is connected directly to the second output.

12. The resistance welding apparatus according to claim 1, wherein the polarity switching device includes software that runs on the polarity switching device for evaluating the polarity information.

* * * * *